US009609170B1

(12) United States Patent
Chapman

(10) Patent No.: US 9,609,170 B1
(45) Date of Patent: Mar. 28, 2017

(54) METHOD AND APPARATUS FOR GENERATING A MULTI-LAYER CORRELATION MARK VIA A MONOCHROME PRINTER

(71) Applicant: Xerox Corporation, Norwalk, CT (US)

(72) Inventor: Edward Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/142,941

(22) Filed: Apr. 29, 2016

(51) Int. Cl.
*H04N 1/40* (2006.01)
*G06K 15/00* (2006.01)
*H04N 1/32* (2006.01)

(52) U.S. Cl.
CPC ..... *H04N 1/32251* (2013.01); *H04N 1/32208* (2013.01); *H04N 1/32219* (2013.01); *H04N 2201/0094* (2013.01)

(58) Field of Classification Search
CPC .......... H04N 1/32251; H04N 1/32208; H04N 1/32219; H04N 2201/0094

USPC ...................... 358/3.01, 3.02, 2.99
See application file for complete search history.

(56) References Cited

U.S. PATENT DOCUMENTS

| 2013/0062510 A1* | 3/2013 | Fujii | G01J 1/0403 250/216 |
| 2013/0128317 A1* | 5/2013 | Chapman | H04N 1/54 358/2.1 |

* cited by examiner

*Primary Examiner* — Douglas Tran

(57) ABSTRACT

A method, non-transitory computer readable medium and apparatus for generating a multi-layer correlation mark via a monochrome printer are disclosed. For example, the method includes setting a first scalar value of a channel of the monochrome printer, setting a second scalar value of the channel of the monochrome printer, generating a first layer of the multi-layer correlation mark at the first scalar value of the channel, generating a second layer of the multi-layer correlation mark at the second scalar value of the channel and printing the multi-layer correlation mark comprising the first layer at the first scalar value of the channel and the second layer at the second scalar value of the channel.

20 Claims, 4 Drawing Sheets

METHOD AND APPARATUS FOR GENERATING A MULTI-LAYER CORRELATION MARK VIA A MONOCHROME PRINTER

The present disclosure relates generally to security printing and, more particularly, to a method and apparatus for generating a multi-layer correlation mark via a monochrome printer.

BACKGROUND

Many documents are protected for various different reasons using various different methods. For example, documents can be protected from copying, forging and counterfeiting using different methods including security printing.

Some security printing requires specialty hardware and/or materials. For example, a specialty document can be used for prescriptions where a pharmacist would like to be able to have a good level of confidence that the document is genuine.

SUMMARY

According to aspects illustrated herein, there are provided a method, non-transitory computer readable medium and apparatus for generating a multi-layer correlation mark via a monochrome printer. One disclosed feature of the embodiments is a method that sets a first scalar value of a channel of the monochrome printer, sets a second scalar value of the channel of the monochrome printer, generates a first layer of the multi-layer correlation mark at the first scalar value of the channel, generates a second layer of the multi-layer correlation mark at the second scalar value of the channel and prints the multi-layer correlation mark comprising the first layer at the first scalar value of the channel and the second layer at the second scalar value of the channel.

Another disclosed feature of the embodiments is a non-transitory computer-readable medium having stored thereon a plurality of instructions, the plurality of instructions including instructions which, when executed by a processor, cause the processor to perform operations that set a first scalar value of a channel of the monochrome printer, set a second scalar value of the channel of the monochrome printer, generate a first layer of the multi-layer correlation mark at the first scalar value of the channel, generate a second layer of the multi-layer correlation mark at the second scalar value of the channel and print the multi-layer correlation mark comprising the first layer at the first scalar value of the channel and the second layer at the second scalar value of the channel.

Another disclosed feature of the embodiments is an apparatus comprising a processor and a computer-readable medium storing a plurality of instructions which, when executed by the processor, cause the processor to perform operations that set a first scalar value of a channel of the monochrome printer, set a second scalar value of the channel of the monochrome printer, generate a first layer of the multi-layer correlation mark at the first scalar value of the channel, generate a second layer of the multi-layer correlation mark at the second scalar value of the channel and print the multi-layer correlation mark comprising the first layer at the first scalar value of the channel and the second layer at the second scalar value of the channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating a multi-layer correlation mark via a monochrome printer. As discussed above, documents may be protected for various different reasons using various different methods. For example, documents can be protected from copying, forging and counterfeiting using different methods including security printing.

Some security printing requires specialty hardware and/or materials. For example, a specialty document can be used for prescriptions where a pharmacist would like to be able to have a good level of confidence that the document is genuine.

However, one type of security printing that uses standard materials such as standard paper, ink and toners is specialty imaging from Xerox®. Currently, the specialty imaging creates a multi-layer correlation mark using different colors on a multiple color channel printer. However, monochrome printers only have a single channel. As a result, monochrome printers cannot employ the specialty imaging methods deployed by multiple color channel printers.

Embodiments of the present disclosure provide a novel method and apparatus generates a multi-layer correlation mark using a monochrome printer by employing different scalar values of the grayscale in each layer of the multi-layer correlation mark. Each layer may be printed at a different angle and/or frequency using a respective scalar value of the grayscale. The combined layers printed by the monochrome printer may form the multi-layer correlation mark for security printing applications.

Figure 1:
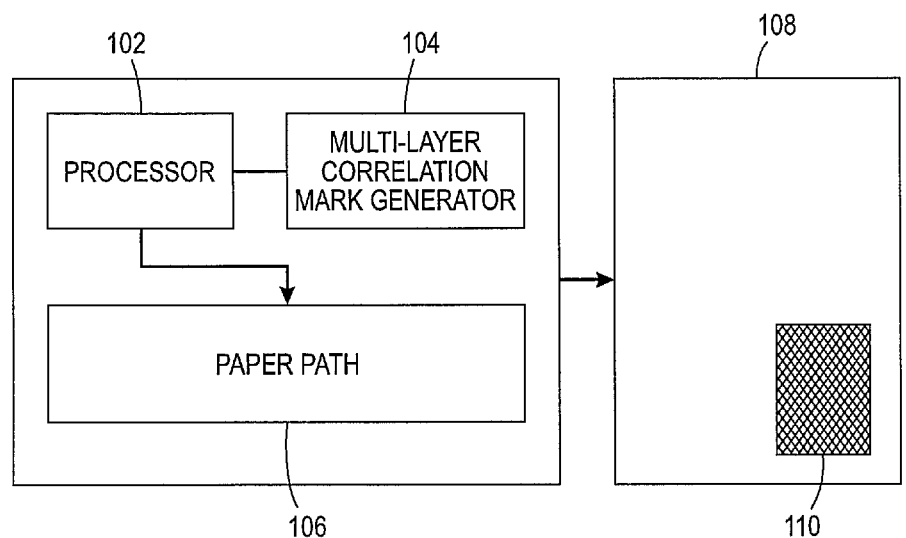
FIG. 1 illustrates an example apparatus of the present disclosure.

FIG. 1 illustrates an example apparatus 100 of the present disclosure. In one embodiment, the apparatus 100 may be a multi-function device (MFD) that has print/scan/fax/copy capabilities, an ink jet printer, a laser printer, and the like. In one embodiment, the apparatus 100 may have a single channel. In other words, the apparatus 100 may only be capable of printing in a single color.

In one embodiment, the apparatus 100 may be a monochrome printer having a single channel that is grayscale. In other words, the apparatus 100 may print in varying degrees of black and white using a single grayscale channel.

In one embodiment, the apparatus 100 may include a processor 102, a multi-layer correlation mark generator 104 and a paper path 106. In one embodiment, the multi-layer correlation mark generator 104 may include instructions stored in a non-transitory computer readable storage medium that are executed by the processor 102 to perform the functions described herein to generate a multi-layer correlation mark 110 on a printing medium 108 (e.g., paper).

In one embodiment, the processor 102 may receive an input to generate the multi-layer correlation mark 110 over an Internet protocol (IP) communication network via a wired or wireless connection (not shown). The processor 102 may generate the multi-layer correlation mark 110 using the multi-layer correlation mark generator 104. The multi-layer correlation mark 110 may then be printed onto the printing medium 108 via the paper path 106 under the control of the processor 102. In one embodiment, the paper path 106 may include various hardware devices and modules (e.g., rollers, paper nips, imaging devices, print heads, and the like) used to transport the printing medium 108 and print the multi-layer correlation mark 110.

Figure 2:
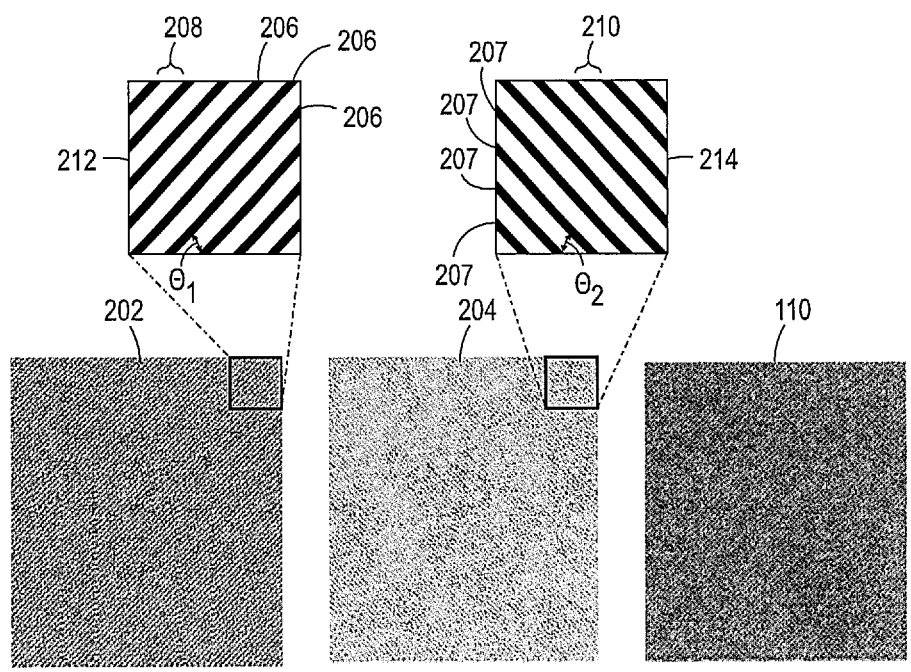
FIG. 2 illustrates an example multi-layer correlation mark of the present disclosure.

FIG. 2 illustrates one example of the multi-layer correlation mark 110. In one embodiment, the multi-layer correlation mark 110 may comprise a combination of a first layer 202 and a second layer 204. In one embodiment, the first layer 202 may have a predefined frequency of lines 206 illustrated by a periodic spacing 208 between the lines 206 illustrated in a box 212 that is a more detailed view of the first layer 202. In one embodiment, the frequency may be defined as an inverse of the periodic spacing 208 between the lines 206. In one embodiment, the periodic spacing 208 may be measured from a middle of one line 206 to a middle of an adjacent line 206. In one embodiment, the frequency may be 75 lines per inch, but could range from 35 to 150 lines per inch for a 600 dots per inch (dpi) resolution. In one embodiment, the first layer 202 may have the lines 206 set at a first angle $\theta_1$.

In one embodiment, the lines 206 in the first layer 202 may be printed by applying a first scalar value to the single channel of the apparatus 100. For example, wherein the single channel is a grayscale channel, the first scalar value may be a percentage value between 0 percent and 100 percent of a level of modulation of the single channel. In other words, the first scalar value may be a percentage value of the black pixel (e.g., 100 percent, or the pixel is "on") that is printed by the grayscale channel.

In one embodiment, the first scalar value may be greater than 10 percent and up to 100 percent (e.g., 10%-100%). For example, if the first scalar value is less than 10 percent the lines 206 of the first layer 202 may not be visible enough to hide and display an image contained in the first layer 202, as discussed below.

In one embodiment, the second layer 204 may have a predefined frequency of lines 207 as illustrated by a periodic spacing 210 between the lines 207 illustrated in a box 214 that shows a more detailed view of the second layer 204. In one embodiment, the predefined frequency of the lines 207 may be the same as the predefined frequency of lines 206 of the first layer 202. When the predefined frequency is the same for the lines 206 and 207, a single key can be used to decode the first layer 202 and the second layer 204. In one embodiment, the periodic spacing 208 may be measured from a middle of one line 207 to a middle of an adjacent line 207.

In one embodiment, the second layer 204 may have the lines 207 set at a second angle $\theta_2$. In one embodiment, the first angle and the second angle may be different or offset by a predefined angle. In one embodiment, the difference between the first angle and the second angle may be sufficient to allow the first image in the first layer 202 and the second image in the second layer 204 to be differentiated by a key, as described below. In one embodiment, the second angle $\theta_2$ may be approximately 45 degrees, but less than approximately 135 degrees, apart from the first angle $\theta_1$.

In one embodiment, the lines 207 in the second layer 204 may be printed by applying a second scalar value to the single channel of the apparatus 100. For example, wherein the single channel is a grayscale channel, the second scalar value may be a percentage value between 0 percent and 100 percent of a level of modulation of the single channel. In other words, the second scalar value may be a percentage value of the black pixel (e.g., 100 percent, or the pixel is "on") that is printed by the grayscale channel.

In one embodiment, the second scalar value may be at least 25 percent apart from the first scalar value. In other words, the difference of the first scalar value and the second scalar value should be at least 25 percent. For example, if the first scalar value is 50 percent, then the second scalar value may be 25 percent or 75 percent. In another example, if the first scalar value is 70 percent, then the second scalar value may be 45 percent or 90 percent, and so forth.

The first layer 202 and the second layer 204 may be combined to generate the multi-layer correlation mark 110 and printed by the apparatus 100 using a single channel (e.g., a monochrome printer using a single grayscale channel). In one embodiment, the multi-layer correlation mark 110 may be printed on a portion of the printing medium 108.

Figure 3:
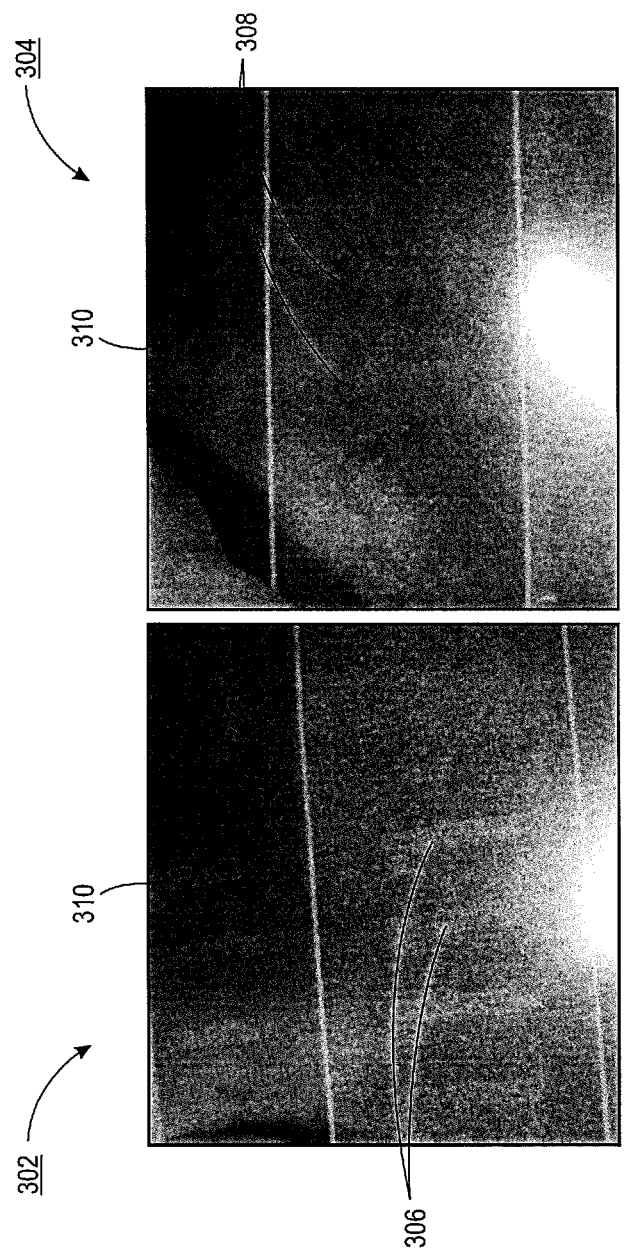
FIG. 3 illustrates examples of the multi-layer correlation mark with the key overlaid on top.

FIG. 3 illustrates an example of the multi-layer correlation mark 110 with a key 310 that is overlaid on top of the multi-layer correlation mark 110. In a first example 302, the key 310 may have a pattern that blocks the lines 207 of the second layer 204 to allow a first image 306 to be visible from the first layer 202. For example, the key 310 may have a pattern that has the same frequency of lines 207 and at the same second angle 82. As a result, when the key 310 is laid on top of the multi-layer correlation mark 110, the first image 306 (e.g., illustrated as the number "11") may be visible.

In a second example 304, the key 310 may be rotated by an amount that is equal to the angular offset between the lines 206 and 207. In other words, the key 310 may have a second pattern that is the same frequency as the lines 206 and at the same first angle $\theta_1$. As a result, when the key 310 is rotated by the appropriate amount and laid on top of the multi-layer correlation mark 110, a second image 308 (e.g., illustrated as the number "22") may be visible.

Notably, the second image 308 may appear within the same area that the first image 306 appeared. In other words, the first layer 202 and the second layer 204 are printed such that the first image 306 and the second image 308 occupy the same space or are within a common area.

As a result, the present disclosure allows for security printing using a monochrome printer that can only print in a single color channel (e.g., grayscale). The present disclosure applies two different scalar values to the grayscale channel to generate the first layer 202 and the second layer 204. The first layer 202 and the second layer 204 may then be offset or rotated by a predefined angle and combined to print the multi-layer correlation mark 110.

Figure 4:
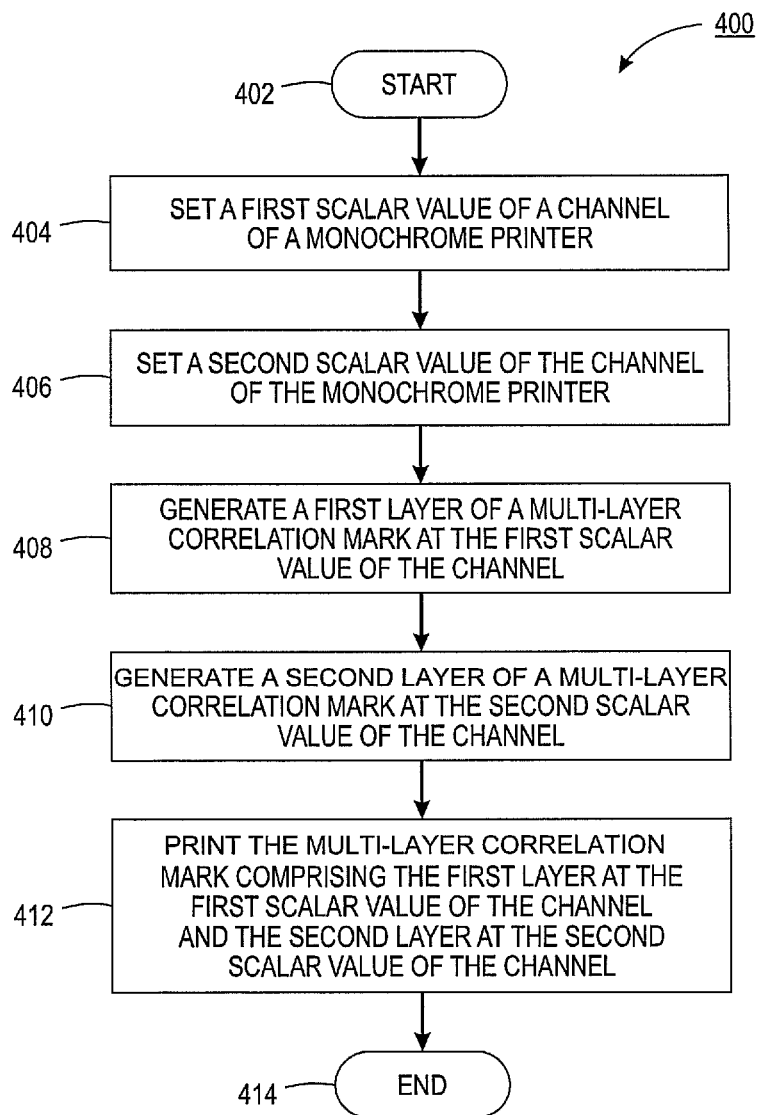
FIG. 4 illustrates a flowchart of an example method for generating a multi-layer correlation mark via a monochrome printer.
Figure 5:
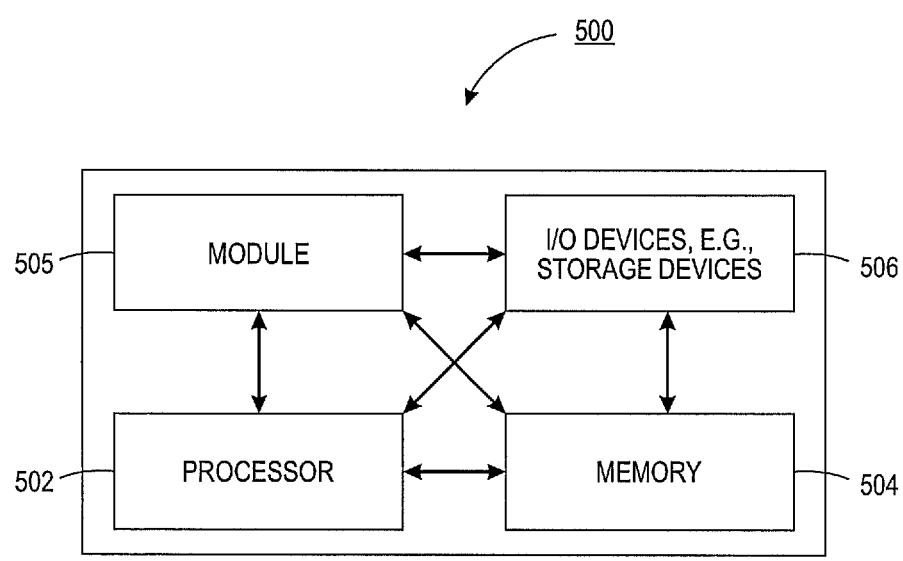
FIG. 5 illustrates a high-level block diagram of a computer suitable for use in performing the functions described herein.

FIG. 4 illustrates a flowchart of a method 400 for generating a multi-layer correlation mark via a monochrome printer. In one embodiment, one or more steps or operations of the method 400 may be performed by the apparatus 100 or a computer as illustrated in FIG. 5 and discussed below.

At block 402, the method 400 begins. At block 404, the method 400 sets a first scalar value of a channel of a monochrome printer. In one embodiment, the channel of the monochrome printer may be a single channel such as a grayscale channel.

In one embodiment, the first scalar value may be a percentage value between 0 percent and 100 percent of a level of modulation of the grayscale channel. In other words, the first scalar value may be a percentage value of the black pixel (e.g., 100 percent, or the pixel is "on") that is printed by the grayscale channel.

In one embodiment, the first scalar value may be greater than 10 percent and up to 100 percent (e.g., 10%-100%). For example, if the first scalar value is less than 10 percent the lines of a first layer may not be visible enough to hide and display an image contained in the first layer, as discussed below.

At block 406, the method 400 sets a second scalar value of the channel of the monochrome printer. In one embodiment, the second scalar value may be a percentage value between 0 percent and 100 percent of a level of modulation of the grayscale channel. In other words, the second scalar value may be a percentage value of the black pixel (e.g., 100 percent, or the pixel is "on") that is printed by the grayscale channel.

In one embodiment, the second scalar value may be at least 25 percent apart from the first scalar value. In other words, the difference of the first scalar value and the second scalar value should be at least 25 percent. For example, if the first scalar value is 50 percent, then the second scalar value may be 25 percent or 75 percent. In another example, if the first scalar value is 70 percent, then the second scalar value may be 45 percent or 90 percent, and so forth.

At block 408, the method 400 generates a first layer of a multi-layer correlation mark at the first scalar value of the channel. For example, the first layer of the multi-layer correlation mark may include an image that is formed by lines having a predefined frequency and set at a first angle. The lines of the first layer may be printed using an amount of the grayscale channel multiplied by the first scalar value.

At block 410, the method 400 generates a second layer of the multi-layer correlation mark at the second scalar value of the channel. For example, the second layer of the multi-layer correlation mark may include an image that is formed by lines having the predefined frequency and set at a second angle. The image of the second layer may be different than the image of the first layer. The lines of the second layer may be printed using an amount of the grayscale channel multiplied by the second scalar value.

In one embodiment, the first angle and the second angle may be offset by a predefined angle. The offset of the predefined angle may determine the first angle and the second angle. For example, if the offset is 90 degrees, the first angle may be 45 degrees and the second angle may be 135 degrees, or the first angle may be 60 degrees and the second angle may be 150 degrees, and so forth. The angles may be measured relative to a direction at the 12 o'clock position of a circle being 0 degrees.

At block 412, the method 400 prints the multi-layer correlation mark comprising the first layer at the first scalar value of the channel and the second layer at the second scalar value of the channel. For example, the multi-layer correlation mark may be printed on a printing medium, such as paper to provide printing security for the document.

In one embodiment, the multi-layer correlation mark may display two different images within the same area when using a key. For example, the key may have two different patterns. A first pattern may be the inverse of the frequency of lines of the second layer and at the same second angle of the lines of the second layer. In other words, the first pattern may have a line where a no line is printed in the first layer and no line where a line is printed in the first layer. As a result, when the key is overlaid on top of the multi-layer correlation mark, the second layer may be "blocked" and allow the image of the first layer to appear.

Conversely, a second pattern of the key may be the inverse of the frequency of lines of the first layer and at the same second angle of the lines of the first layer. As a result, when the key is rotated by the predetermined angle that first layer and the second layer are offset by, the key may "block" the first layer and allow the image of the second layer to appear within a common area.

Thus, the method 400 allows a monochrome printer that only prints in black and white using a single grayscale channel to print a multi-layer correlation mark. At block 414, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application.

FIG. 5 depicts a high-level block diagram of a computer that can be transformed to into a machine that is dedicated to perform the functions described herein. As a result, the embodiments of the present disclosure improve the operation and functioning of a multi-function device to generate a multi-layer correlation mark via a monochrome printer, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for generating a multi-layer correlation mark via a monochrome printer, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for generating a multi-layer correlation mark via a monochrome printer (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for generating a multi-layer correlation mark via a monochrome printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating a multi-layer correlation mark via a monochrome printer, comprising:
    setting, by a processor, a first scalar value of a channel of the monochrome printer;
    setting, by the processor, a second scalar value of the channel of the monochrome printer;
    generating, by the processor, a first layer of the multi-layer correlation mark at the first scalar value of the channel;
    generating, by the processor, a second layer of the multi-layer correlation mark at the second scalar value of the channel; and
    printing, by the processor, the multi-layer correlation mark comprising the first layer at the first scalar value of the channel and the second layer at the second scalar value of the channel.

2. The method of claim 1, wherein the channel of the monochrome printer comprises a grayscale channel.

3. The method of claim 1, wherein the first scalar value and the second scalar value each comprises a percentage value between 0 percent and 100 percent of a level of modulation of the channel.

4. The method of claim 3, wherein the first scalar value is greater than 10 percent.

5. The method of claim 3, wherein the second scalar value and the first scalar value have a difference greater than 25 percent.

6. The method of claim 1, wherein the first layer and the second layer are offset by a predefined angle.

7. The method of claim 1, wherein the first layer and the second layer each have a predefined frequency.

8. The method of claim 1, wherein the first layer displays a first image when a key is applied to the multi-layer correlation mark.

9. The method of claim 8, wherein the second layer displays a second image within an area that that the first image was displayed when the key is rotated by a predefined angle and is applied to the multi-layer correlation mark, wherein the second image is different from the first image.

10. A non-transitory computer-readable medium storing a plurality of instructions, which when executed by a processor, cause the processor to perform operations for generating a multi-layer correlation mark via a monochrome printer, the operations comprising:
    setting a first scalar value of a channel of the monochrome printer;
    setting a second scalar value of the channel of the monochrome printer;
    generating a first layer of the multi-layer correlation mark at the first scalar value of the channel;
    generating a second layer of the multi-layer correlation mark at the second scalar value of the channel; and
    printing the multi-layer correlation mark comprising the first layer at the first scalar value of the channel and the second layer at the second scalar value of the channel.

11. The non-transitory computer-readable medium of claim 10, wherein the channel of the monochrome printer comprises a grayscale channel.

12. The non-transitory computer-readable medium of claim 10, wherein the first scalar value and the second scalar value each comprises a percentage value between 0 percent and 100 percent of a level of modulation of the channel.

13. The non-transitory computer-readable medium of claim 12, wherein the first scalar value is greater than 10 percent.

14. The non-transitory computer-readable medium of claim 12, wherein the second scalar value and the first scalar value have a difference greater than 25 percent.

15. The non-transitory computer-readable medium of claim 10, wherein the first layer and the second layer are offset by a predefined angle.

16. The non-transitory computer-readable medium of claim 10, wherein the first layer and the second layer are offset by a predefined frequency.

17. The non-transitory computer-readable medium of claim 10, wherein the first layer displays a first image when a key is applied to the multi-layer correlation mark.

18. The non-transitory computer-readable medium of claim 17, wherein the second layer displays a second image within an area that the first image was displayed when the key is rotated by a predefined angle and is applied to the multi-layer correlation mark, wherein the second image is different from the first image.

19. A method for generating a multi-layer correlation mark via a monochrome printer, comprising:
    setting, by a processor, a first scalar value, wherein the first scalar value represents a percentage of a grayscale value of a grayscale channel of the monochrome printer that is applied;
    setting, by the processor, a second scalar value, wherein the second scalar value represents a percentage of the grayscale value of the grayscale channel of the monochrome printer that is applied, wherein the difference between the second scalar value and the first scalar value is at least 25 percent;
generating, by the processor, a first layer of the multi-layer correlation mark via the grayscale value multiplied by the first scalar value;
generating, by the processor, a second layer of the multi-layer correlation mark via the grayscale value multiplied by the second scalar value; and
printing, by the processor, the multi-layer correlation mark comprising the first layer and the second layer within a common area such that a first image of the first layer and a second image of the second layer are displayed within the common area via a key.

20. The method of claim 19, wherein the first layer and the second layer are offset by a predefined angle.

\* \* \* \* \*